United States Patent [19]

Seki et al.

[11] Patent Number: 4,658,315
[45] Date of Patent: Apr. 14, 1987

[54] MAGNETIC HEAD MOUNTING DEVICE OF MAGNETIC RECORDING APPARATUS

[75] Inventors: Gen Seki; Seiichi Hayashi, both of Mito; Haruyuki Kaito; Akira Tatsumi, both of Hitachi, all of Japan

[73] Assignee: Hitachi, Ltd., Tokyo, Japan

[21] Appl. No.: 659,564

[22] Filed: Oct. 10, 1984

[30] Foreign Application Priority Data

Oct. 12, 1983 [JP] Japan .................. 58-191510

[51] Int. Cl.⁴ ......................... G11B 5/54; G11B 5/48
[52] U.S. Cl. .................................. 360/104; 360/105; 360/106; 360/99
[58] Field of Search ............... 360/104, 103, 106, 129, 360/105, 97, 99

[56] References Cited

U.S. PATENT DOCUMENTS

| 4,151,573 | 4/1979 | Tandon et al. | 360/104 |
| 4,349,851 | 9/1982 | Higashiyama et al. | 360/104 |
| 4,423,449 | 12/1983 | Hasegawa | 360/105 |

FOREIGN PATENT DOCUMENTS

| WO81/01071 | 4/1981 | PCT Int'l Appl. | 360/104 |
| 2086124 | 5/1982 | United Kingdom | 360/104 |

OTHER PUBLICATIONS

Brock et al., "Transducer Mounting", IBM Technical Disclosure Bulletin, vol. 21, No. 7, Dec. 1978, pp. 2694-2695.

Grometer et al., "Compliant Head Mounting", IBM Technical Disclosure Bulletin, vol. 5, No. 1, Jun. 1962, p. 34.

Primary Examiner—John H. Wolff
Assistant Examiner—Matthew J. Bussan
Attorney, Agent, or Firm—Antonelli, Terry & Wands

[57] ABSTRACT

A magnetic head mounting device of a magnetic recording apparatus including a carriage, a first magnetic head supported by the carriage, a head arm supported by the carriage for movement in a vertical direction, and a second magnetic head supported by the head arm and disposed in spaced juxtaposed relation to the first magnetic head, wherein both or one of the first magnetic head and second magnetic head is mounted on the carriage or head arm through a gimbal. The gimbal includes a head mounting section for mounting the first magnetic head or second magnetic head thereto, and a supported section disposed outwardly of the head mounting section and partly supported by projections located at the carriage or head arm, the head mounting section and supported section being partly connected together through a plurality of connections. The gimbal is mounted to one or both of the head arm and carriage in such a manner that the head mounting section and supported section are connected together in a direction which is parallel to the direction of sliding movement of the carriage.

5 Claims, 13 Drawing Figures

MAGNETIC HEAD MOUNTING DEVICE OF MAGNETIC RECORDING APPARATUS

BACKGROUND OF THE INVENTION

(1) FIELD OF THE INVENTION

This invention relates to a magnetic head mounting device of a magnetic recording apparatus enabling the operation of writing/reading information with respect to a thin flexible magnetic disc to be advantageously performed.

(2) DESCRIPTION OF THE PRIOR ART

Generally, surfaces of a thin flexible magnetic disc are not completely flat and have some riffles. These riffles would impart vibrations to the magnetic heads and cause angular displacements to occur in them, as they move on the surfaces of the magnetic disc. These vibrations are less in a direction in which a carriage moves in sliding movement than in a direction in which the magnetic heads move in revolving movement. Experiments have shown that angular displacements of the magnetic heads in the revolving direction of the magnetic heads are 5-10 times the angular displacement of the magnetic heads in a sliding (seek) direction of the carriage. To enable the magnetic heads to cope with the angular displacements, the vertical dimension of a slider of each magnetic head might be increased. However, an increase in the vertical dimension of the sliders would increase the length of the magnetic path, rendering the magnetic heads susceptible to external noises. Moreover, since the distance between the surfaces of the magnetic disc and the positions in which the magnetic heads are mounted increases, the phenomenon of off-tracking of the magnetic heads might occur, resulting in the operation of writing/reading information being erratically performed with respect to the magnetic disc.

SUMMARY OF THE INVENTION

This invention has as its object the provision of a magnetic head mounting device of a magnetic recording apparatus enabling vibrations imparted to the magnetic heads and causing angular displacements to occur in them to be absorbed by gimbals without requiring an increase in the vertical dimension of sliders of the magnetic heads, whereby the magnetic heads can exhibit an improved response to the magnetic disc.

According to the invention, there is provided a magnetic head mounting device of a magnetic recording apparatus comprising a carriage, a first magnetic head supported by the carriage, a head arm supported by the carriage for movement in a vertical direction, and a second magnetic head supported by the head arm and disposed in spaced juxtaposed relation to the first magnetic head, wherein both or one of the first magnetic head and second magnetic head is mounted on the carriage or head arm through a gimbal including a head mounting section for mounting the first magnetic head or second magnetic head thereto, and a supported section disposed outwardly of the head mounting section and partly supported by projections located at the carriage or head arm, the head mounting section and supported section being partly connected together through a plurality of connections, and the gimbal being mounted to one or both of the head arm and carriage in such a manner that the head mounting section and supported section are connected together in a direction which is parallel to the direction of sliding movement of the carriage.

DESCRIPTION OF THE PREFERRED EMBODIMENTS

Preferred embodiments of the invention will now be described by referring to the accompanying drawings.

Figure 1:
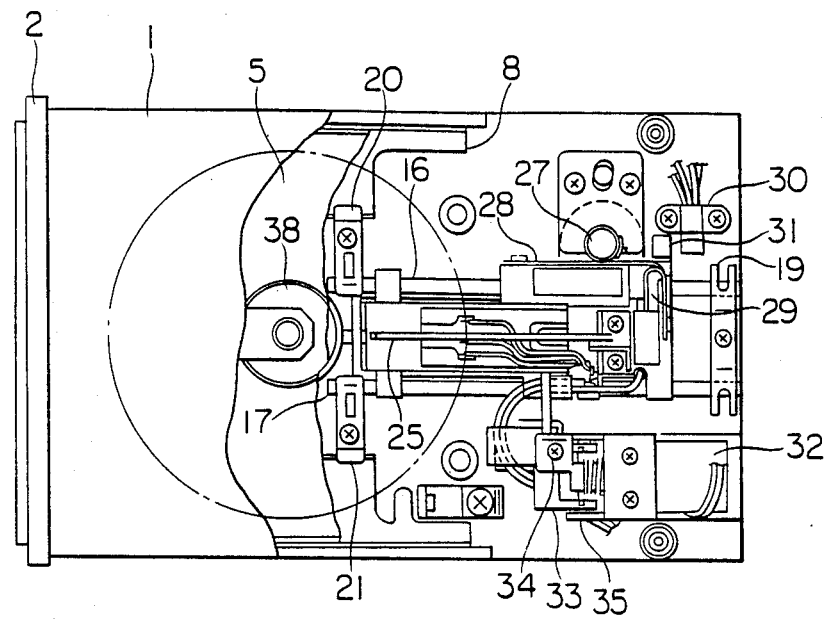
FIG. 1 is a plan view of a magnetic recording apparatus in which the present invention is incorporated.
Figure 2:
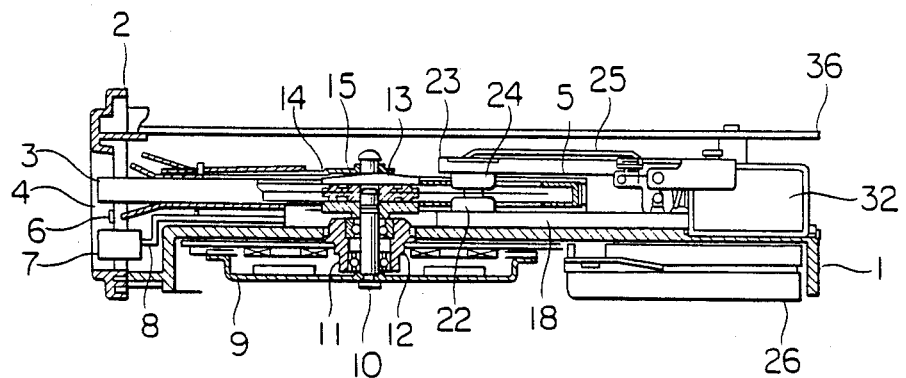
FIG. 2 is a vertical sectional view of the magnetic recording apparatus shown in FIG. 1.

Referring to FIGS. 1 and 2, a chassis 1 formed of aluminum has located in the front, a panel 2 formed of a synthetic resinous material and having an opening 4 through which a hard case 3 also formed of a synthetic resinous material is inserted into the chassis 1. The hard case 3 contains a magnetic disc 5 for rotation. Located in the chassis 1 is a cassette holder 6 to which the hard case 3 is mounted by means of an ejecting lever 8 actuated as an ejection button 7 is depressed. A flat motor 9 serving as a source of motive-power for rotating the magnetic disc 5 is located in a central portion of the chassis 1.

The flat motor 9 has a rotary shaft 10 supported by the chassis 1 through a bearing portion 11 and having secured to its end portion a hub support 12. In the hub support 12, the rotary shaft 10 extends upwardly from its top surface to constitute a main shaft, and a drive shaft located outwardly of the main shaft is provided. A hub 13 formed of a synthetic resinous material and located in a central portion of the magnetic disc 5 has an opening in which the rotary shaft 10 is fitted, and a locking wall with which the drive shaft is brought into locking engagement. The magnetic disc 5 includes a disc portion formed of a flexible material which is small in thickness. The cassette holder 6 is provided with a collet lever 14 formed of stainless steel which supports at its forward end a collet 15 for rotation. When the hard case 3 is fully inserted in the cassette holder 6, the hub 13 is held between the collet 15 and hub support 12 by the collet lever 14. As the flat motor 9 is driven for rotation after the hub 13 is held between the collet 15 and hub support 12, the hub 13 rotates at the same speed as the rotary shaft 10.

On the chassis 1, a carriage 18 formed of a synthetic resinous material is slidably supported by guide shafts 16 and 17 secured to the chassis 1 by holders 19, 20 and 21. The carriage 18 has secured thereto a first magnetic head 22 for performing the operation of writing/reading information with respect to the magnetic head disc 5 and is provided with a head arm 23 formed of a synthetic resinous material and having secured thereto a second magnetic head 24 for performing the operation of writing/reading information with respect to the magnetic disc 5. The first magnetic head 22 and second magnetic head 24 are located in spaced juxtaposed relation with the magnetic disc 5 being interposed therebetween, and urged by the biasing force of a head arm spring 25 connected to the head arm 23 to press against opposite surfaces of the magnetic disc 5 with a suitable pressing force. Movements of the carriage 18 are effected by a step motor 26 including a rotary shaft supporting a pulley 27 secured to its end. A steel belt 28 secured at opposite ends to the carriage 18 is trained over the pulley 27 in a condition in which the steel belt 28 is suitably tensioned by a spring 29. As the step motor 26 rotates, the steel plate 28 is wound on the pulley 27 to cause the carriage 18 to move in sliding movement on the guide shafts 16 and 17 a distance corresponding to the length of the steel belt 28 wound on the pulley 27.

A track sensor 30 which is of a light transmitting type is operative to monitor the positions of tracks on the magnetic disc 5 for performing the operation of writing/reading information. An interrupter 31 which is formed integrally with the carriage 18 has the function of interrupting a light beam incident on the track sensor 30. A head load solenoid 32 serves as a source of motive-power for driving a lever 33 for moving the head arm 23 in a vertical direction. The distance covered by the movement of the lever 33 is adjusted by means of an adjusting screw 34. The lever 33 and adjusting screw 34 are mounted on a support member 35, and a printed circuit board 36 is secured to the chassis 1.

Figure 3:
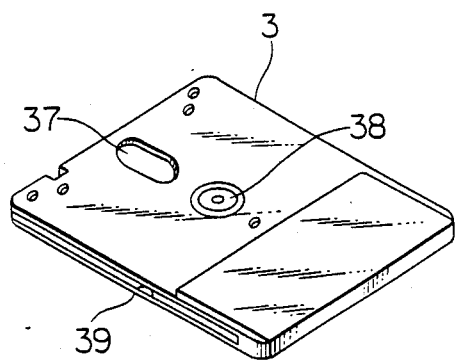
FIG. 3 is an external view of the hard case of a magnetic disc.

Referring to FIG. 3, the hard case 3 is formed with an opening 37 constituted by a plurality of slots formed in top and bottom layers respectively and aligned with each other, and an opening 38 for allowing the collet 15 or hub support 12 to come into contact with the hub 13. The slot-like opening 37 which is designed to allow the first magnetic head 22 or second magnetic head 24 to come into contact with the magnetic disc 5 is normally closed by shutters, not shown. As the hard case 3 is inserted in the cassette holder 6, a slider 39 located on one side of the hard case 3 is brought into engagement with a locking portion of the cassette holder 6, thereby opening the shutters to expose the magnetic disc 5.

Figure 4:
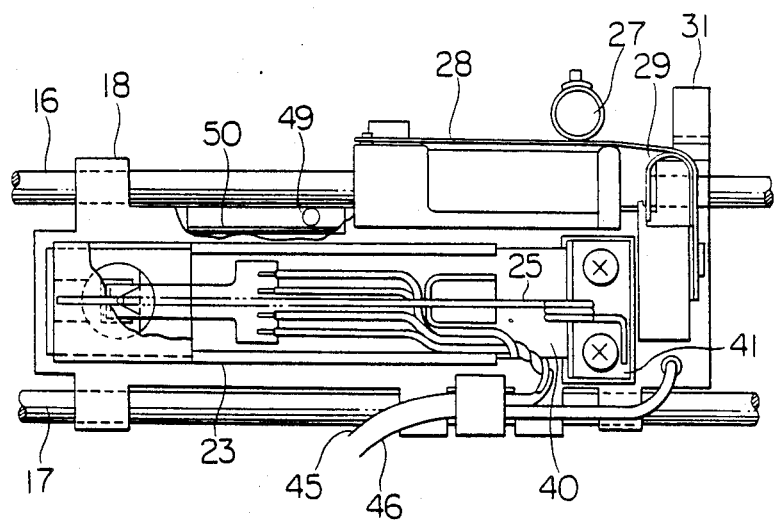
FIG. 4 is a plan view of the carriage and head arm of the magnetic head mounting device comprising one embodiment of the invention.
Figure 5:
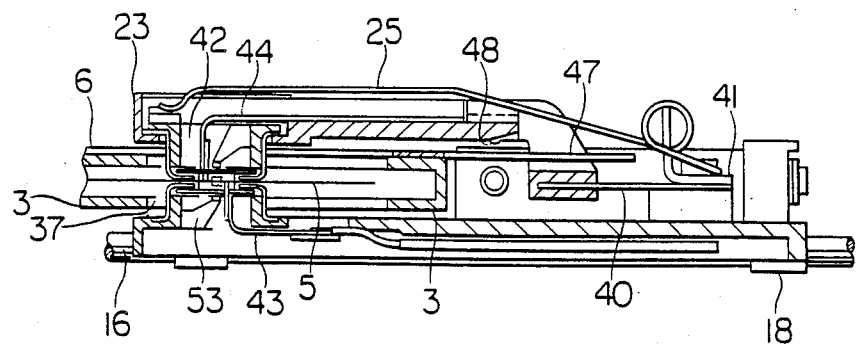
FIG. 5 is a sectional view of the carriage and head arm shown in FIG. 4.

Referring to FIGS. 4 and 5, the head arm 23 has connected to one end a plate spring 40 which is secured to the carriage 18 together with a support plate 41 for supporting the head arm spring 25. The head arm 23 has adhesively connected to the other end a head support member 42 formed of a synthetic resinous material which supports the second magnetic head 24. A conductor 43 connected to the first magnetic head 22 and a conductor 44 connected to the second magnetic head 24 are connected to the printed circuit board 36 via conductors 45 and 46 respectively.

The cassette holder 6 has connected thereto a lever 47 which is constructed such that a projection 48 formed in the head arm 23 is positioned against the lever 47 to cause the head arm 23 to move upwardly, to thereby move the second magnetic head 24 upwardly to form a passage for the hard case 3. A roller 49 which is maintained in point-to-point contact with the guide shaft 16 and a plate spring 50 performs the function of allowing the biasing force of the plate spring 50 to be exerted on the guide shaft 16.

Figure 6:
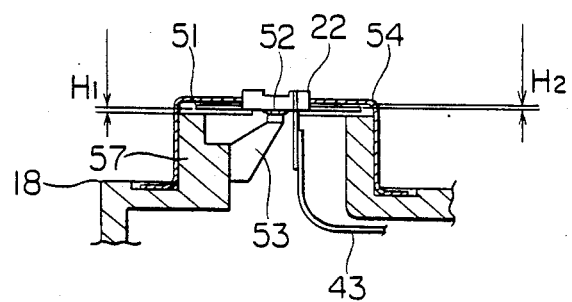
FIG. 6 is a sectional view of the head supporting member of the carrriage.

Referring to FIG. 6, the first magnetic head 22 is resiliently supported by a gimbal 51 with respect to the carriage 18. The gimbal 51 has a spherical seat 52 in a central portion, and a pivot 53 formed integrally with the carriage 18 is positioned against the spherical seat 53. The gimbal 51 is constructed such that a slight displacement can take place at a point of contact between a planar surface of the pivot 53 and the spherical seat 52. A head cap 54 which is formed of a magnetic shield material is located in a position spaced apart from a top surface of the gimbal 51 a distance $H_2$.

The gimbal 51 which is formed of a beryllium bronze sheet and has a thickness in the range between 30 and 100 $\mu$ includes a mounting section 51A of a substantially circular shape on which the first magnetic head 22 is mounted, and a supported section 51B of an annular shape located outwardly of the head mounting section 51A and supported by the carriage 18 or head arm 23. The head mounting section 51A and supported section 51B are partly connected together through two connections 55 and 56.

Figure 7:
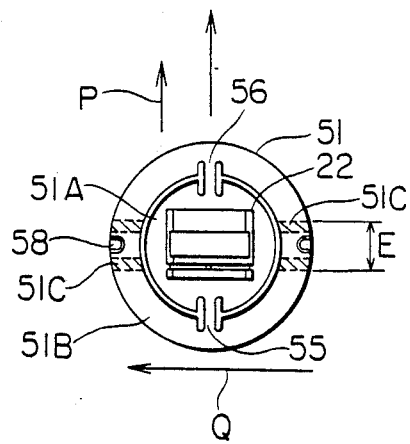
FIG. 7 is a plan view of the head supporting member of the carriage shown in FIG. 6.
Figure 8:
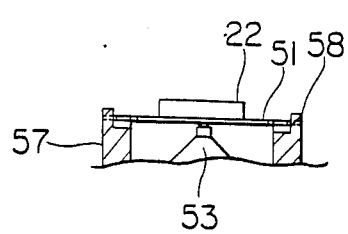
FIG. 8 is a sectional view of the essential portions of the head supporting member of the carriage shown in FIG. 7, shown in a cross section disposed at right angles to the plane of FIG. 7.
Figure 9:
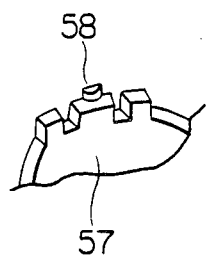
FIG. 9 is a view, shown on an enlarged scale, of the essential portions of the head supporting member of the carriage shown in FIG. 8.

The supported section 51B of the gimbal 51 is adhesively secured to top surfaces (height, $H_1$; width, E) of two projections 57 formed integrally with the carriage 18. The top surfaces of the two projections 57 are formed with recesses for allowing an excess adhesive agent to escape. A clearance is defined, as shown in FIG. 7, between the head mounting section 51A and supported section 51B of the gimbal 51 in a portion other than the two connections 55 and 56 which are aligned with the direction of movement of the carriage 18 (the direction indicated by an arrow P in FIG. 7 is referred to as a seek direction). The two connections 55 and 56 and the two projections 57 are arranged such that a straight line connecting the two connections 55 and 56 together is at a right angle to a straight line connecting the two projections 57 to a stationary portion of the supported section 51B. It is in regions designated by 51C (hatched regions) in FIG. 7 that the adhesive agent is applied. A protuberance 58 is formed at an upper end of each of the projections 57, as clearly shown in FIGS. 8 and 9, for effecting positioning of the gimbal 51.

Figure 10:
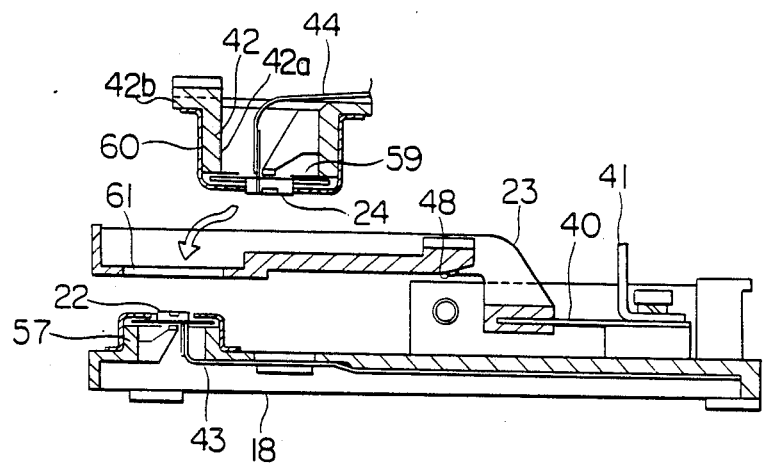
FIG. 10 is a view showing the head supporting member of the carriage being mounted to the head arm.

As shown in FIG. 10, the head support member 42 has a gimbal 59 and a head cap 60 formed of a magnetic shield material mounted thereto in the same manner as the gimbal 51 and head cap 54 are mounted to the first magnetic head 22. The head support member 42 is inserted in an opening 61 formed in the head arm 23 connected to the carriage 18 for mounting the head support member 42. After the head support member 42 is inserted in the opening 61, a flange 42b of the head support member 42 is adhesively secured to peripheral edges of the opening 61.

A magnetic head mounting surface of the head support member 42 preferably protrudes upwardly from a top surface of the head arm 23 and is disposed inwardly of the slot-like opening 37 of the hard case 3, as shown in FIG. 5, so that it is located as close to the magnetic disc 5 as possible. Magnetic head mounting surfaces of the two projections 57 are preferably disposed inwardly of the slot-like opening 37 of the hard case 3, as shown in FIG. 5, so that they are located as close to the magnetic disc 5 as possible.

The first magnetic head 22 is secured to the carriage 18 together with the gimbal 51 and head cap 54. Then, the plate spring 40 connected to the one end of the head arm 23 is secured to the carriage 18 together with the support member 35. The head support member 42 is not secured to the head arm 23 yet.

The second magnetic head 24, gimbal 59 and head cap 60 are mounted to the head support member 42 beforehand. Then, a cylindrical portion 42a of the head support member 42 is inserted in the opening 61 formed in the head arm 23, and the head support member 42 is adhesively secured at a flange 42b thereof to the head arm 23 after the second magnetic head 24 is positioned relative to the first magnetic head 22. When the head support member 42 has been secured to the head arm 23, the cylindrical portion 42a of the head support member extends downwardly of the head arm 23 to provide a projecting portion.

Figure 11:
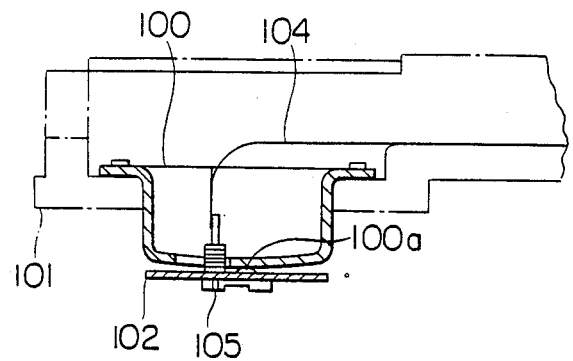
FIG. 11 is a sectional view, on an enlarged scale, of the essential portions of another embodiment.
Figure 12:
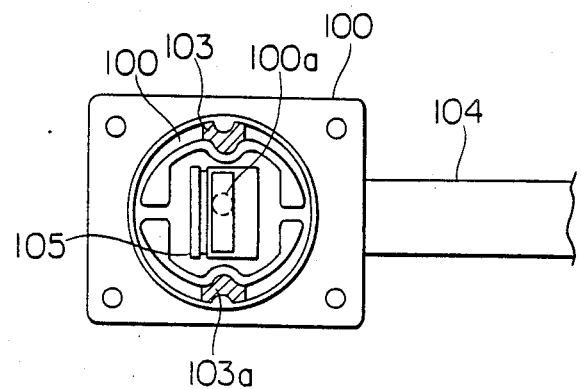
FIG. 12 is a plan view of the essential portions of another embodiment shown in FIG. 11.

FIGS. 11 and 12 show another embodiment of the invention in which the head support member 42 and gimbal 59 are distinct in construction from those shown in FIG. 10. More specifically, a head support member 100 formed of a magnetic shield material is adhesively secured to a head arm 101 formed of a synthetic resinous material indicated by phantom lines. A gimbal 102 is positioned against support portion 100a formed at the head support member 100 and held for miniscule rotary movements about a point of contact between them. A gimbal 102 is welded to the head support member 100 in hatched regions 103 and 103a shown in FIG. 12 and has secured thereto a magnetic head 105 connected to a conductor 104.

In the aforesaid construction, the head mounting section 51A of the gimbal 51 to which the first magnetic head 22 is mounted greatly rotates about an axis (an axis y shown in FIG. 7) extending through the two connections 55 and 56. This axis is parallel to the direction of sliding movement (seek direction) P of the carriage 18. Thus, the head mounting section 51A of the gimbal 51 smoothly rotates when a large angular displacement takes place in the first magnetic head 22 in the direction of rotation (direction Q indicated by an arrow in FIG. 7), thereby greatly improving the response characteristic of the first magnetic head 22 with respect to the magnetic disc 5. This also applies to the second magnetic head 24.

Figure 13:
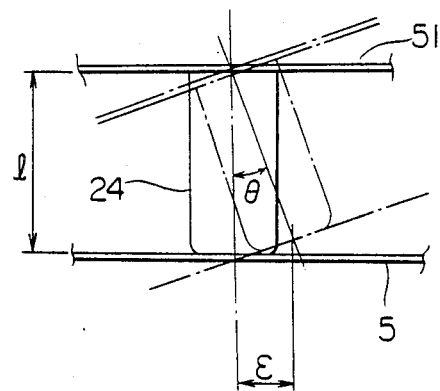
FIG. 13 is a view in explanation of the manner in which the magnetic heads contact the magnetic disc.

Referring to FIG. 13, when the first magnetic head 22 and second magnetic head 24 are tilted through an angle $\theta$ by riffles formed on the surfaces of the magnetic disc 5, a maximum displacement $\epsilon$ is produced in the first and second magnetic heads 22 and 24 with respect to the magnetic disc 5. Let the height of the first and second magnetic heads 22 and 24 be denoted by l. Then, the maximum displacement $\epsilon$ can be expressed as $l \sin\theta$. Therefore, the smaller the height l, the smaller the maximum displacement $\epsilon$. In the present invention, the response characteristic of the first and second magnetic heads 22 and 24 with respect to the magnetic disc 5 is improved without increasing the height of the first and second magnetic heads 22 and 24, so that the length of the magnetic path of the magnetic heads is reduced and the magnetic heads become increasedly imprevious to influences exerted by external noises thereon. At the same time, the occurrence of the phenomenon of off-track is reduced in incidence, and the operation of writing/reading information with respect to the magnetic disc 5 can be performed with increased stability. According to the invention, it is possible to reduce the vertical dimension or height of the first magnetic head 22 and second magnetic head 24, and to cope with an angular displacement produced in the first magnetic head 22 and second magnetic head 24 by providing the head mounting section 51A without increasing the area of the gimbal 51, thereby making it possible to obtain a compact size in a magnetic head mounting device.

From the foregoing description, it will be appreciated that according to the invention, it is possible to absorb by means of gimbals the vibrations of the magnetic heads caused by riffles formed on the surfaces of the magnetic disc without increasing the vertical dimension or height of the slider of each of the magnetic heads. Thus, the magnetic head mounting device of a magnetic recording apparatus provided by the invention has an excellent response characteristic of the magnetic heads with respect to the magnetic disc.

What is claimed is:

1. A magnetic head mounting device of a magnetic recording apparatus, comprising:
   a chassis;
   guide shafts provided in said chassis;
   a carriage supported slidably on said guide shafts;
   a head arm provided on said carriage;
   a first magnetic head disposed on said carriage through a first gimbal;
   a second magnetic head disposed on said head arm through a second gimbal, said second magnetic head being arranged to confront said first magnetic head through a magnetic disc; and
   a head arm spring for pressing said second magnetic head against said first mangetic head through said magnetic disc,
   said carriage including projections for mounting said first gimbal and for allowing a support surface of said first gimbal to extend into a first opening contained in a planar surface of a disc bearing hard cover,
   said head arm including a support member for mounting said second gimbal and for allowing a support surface of said second gimbal to extend into a second opening contained in a planar surface of a disc bearing hard cover; and
   said first gimbal including a head mount section on which said first magnetic head is mounted, a support section loated outwardly of said head mount section and partially supported by said projections, and a plurality of connections for partially connecting said support section and said head mount section to each other, said plurality of connections being arranged in parallel to a sliding direction of said carriage.

2. A magnetic head mounting device according to claim 1, wherein said support section and said head mount section are connected to each other through a pair of said connections, said projections and said support section being fixed to each other at two fixing portions and a line connecting said pair of connections being perpendicular to a line connecting said two fixing portions.

3. A magnetic head mounting device according to claim 1, wherein said projections are formed integrally with said carraige.

4. A magnetic head mounting device according to claim 1, wherein said head support member is constructed independently of said head arm, and said head support member is made of material having a magnetically shielding characteristic.

5. A magnetic head mounting device according to claim 4, wherein said head support member is adhered to said head arm, and said second gimbal is welded at a part thereof to said head support member.

* * * * *